Aug. 16, 1932.   W. SYKES   1,872,360
MOTOR CONTROL SYSTEM
Original Filed July 19, 1924
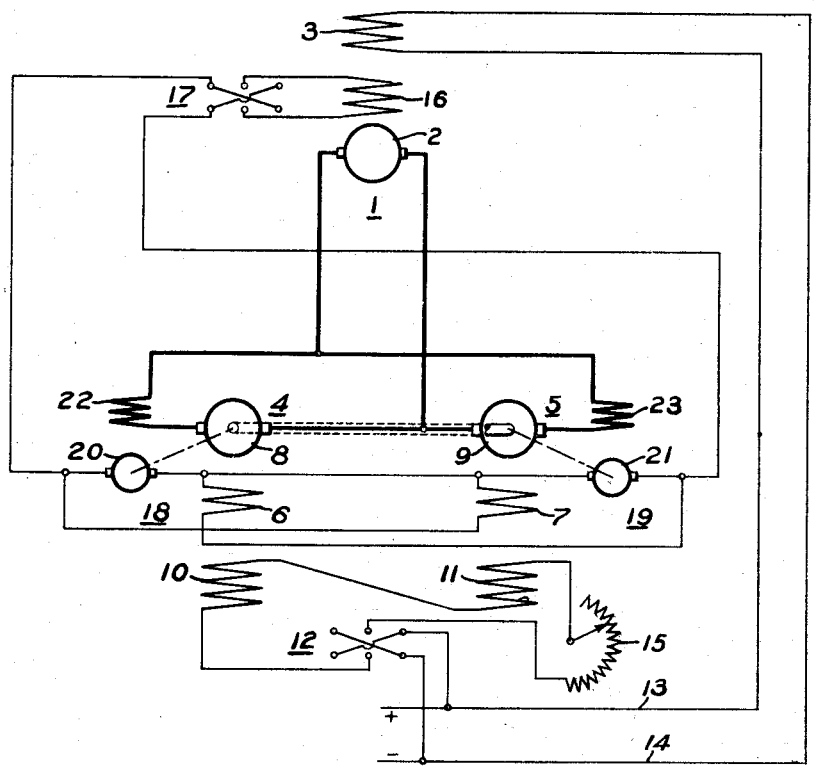
WITNESSES:
INVENTOR
Wilfred Sykes.
BY
ATTORNEY Patented Aug. 16, 1932

1,872,360

UNITED STATES PATENT OFFICE

WILFRED SYKES, OF CHICAGO, ILLINOIS, ASSIGNOR TO WESTINGHOUSE ELECTRIC & MANUFACTURING COMPANY, A CORPORATION OF PENNSYLVANIA

MOTOR CONTROL SYSTEM

Application filed July 19, 1924, Serial No. 726,900. Renewed May 21, 1931.

My invention relates to systems of control and it has particular relation to systems employed for operating reversing mills and for similar applications.

One object of my invention is to provide a system for insuring proper division of load between direct-current generators that are operated in parallel relation.

Another object of my invention is to provide variable-voltage control for a translating device when operated from parallel-connected generators.

In order to avoid the necessity of employing generators connected in series relation, for ordinary reversing service, at a line potential of 600 volts, for example, I propose to connect the generators in parallel relation and control the excitation of each machine in accordance with load conditions in a manner that will automatically insure a proper division of load on the generators.

In accordance with my invention, each generator is excited from an independent series exciter that is responsive to the load current and is so connected that the excitation of one generator is regulated in accordance with the out-put of another generator.

With this parallel operation, I am enabled to employ standard machines and a single motor, all designed for 600-volt operation. The desirability of employing a single motor rather than several machines is well recognized, as is also the limitation in the size of generators that may be operated at suitably high speeds. With motors and generators connected in series relation, it is impractical to employ a single motor in circuit with more than one generator on account of voltage limitations, the motor voltage in the latter case being at least twice that of the generators.

My invention will be described in connection with the accompanying drawing, in which the single figure is a diagrammatic view of circuits and apparatus embodying my invention.

With reference to the drawing, a reversing-mill motor 1, having an armature 2 and a separately excited field-magnet winding 3, is connected in "loop circuit" with a pair of mechanically-connected or coupled generators 4 and 5 which are provided with field-magnet windings 6 and 7 and with armatures 8 and 9 respectively driven in any suitable manner. For the purpose of manually controlling the generator field excitation, I employ separately-excited field windings 10 and 11 that are, for convenience, connected in series relation and are connected, through a reversing switch 12, to a separate source of excitation comprising line conductors 13 and 14. The excitation of field windings 10 and 11 may be conveniently adjusted in any suitable manner, as by means of a series-connected rheostat 15.

The motor 1 is provided also with an auxiliary field-magnet winding 16 which is connected, through a reversing switch 17, in circuit with a pair of series-connected exciters 18 and 19 having armatures 20 and 21 and field-magnet windings 22 and 23, respectively. These exciters are mechanically connected to, and driven by, the generators 4 and 5.

Field winding 22 is connected in series relation with generator armature 8, and field winding 23 is connected in series relation with generator armature 9. Furthermore, generator field winding 7 is connected across the exciter armature 20. In this manner, the excitation of exciter 18 is dependent upon the output of generator 4, and exciter 18 controls the excitation of generator 5.

Similarly, exciter 19 is responsive to the output of generator 5 and likewise controls the excitation of field winding 6 of generator 4.

Assuming the apparatus to be in its illustrated and inoperative condition, the generator armatures 8 and 9 are first brought to normal speed and the motor 1 is started in a forward direction by actuating reversing switches 12 and 17 to their right-hand operative positions. In this manner, the generator field windings 10 and 11 are energized in a certain direction from line conductors 13 and 14 which also provide excitation for the motor field winding 3.

The exciters 18 and 19 supply the motor field winding 16 and they also add to the excitation of the generators 4 and 5 by means of the field windings 6 and 7, respectively.

The motor 1 is accelerated by increasing the generator field excitation in a customary manner by means of the rheostat 15, for example. The load current from generators 4 and 5, which are connected in parallel relation, traverses exciter field windings 22 and 23, respectively, and if, for example, generator 4 tends to take more than its share of the load, this additional load-current increases the excitation of the exciter winding 22, which produces a corresponding effect upon the voltage of exciter armature 20 and, therefore, upon the field winding 7 of generator 5. This increase in the excitation of generator 5 tends to restore the load balance. The force tending to maintain balance may be made greater than the disturbing element, so that, for all practical purposes, the load will be equally divided between the generators at all times.

In a similar manner, if generator 5 tends to assume more than its proportion of the load, the excitation of exciter 19 is correspondingly increased, which produces additional current in the field winding 6 of generator 4. In this manner, balance is again restored. In fact, the reactions due to fluctuations in load are automatically and inherently controlled with a minimum degree of disturbance.

When it is desired to reverse the direction of operation of the motor 1, both reversing switches 12 and 17 are actuated to their left-hand operative positions, thereby simultaneously effecting reversal of generator field-windings 10 and 11 and of the motor winding 16, which is usually employed for its compounding effect.

Reversal of the field winding 16, through switch 17, is necessary in order to maintain the cumulative compounding effect on the motor 1 because of the fact that reversal of current through the generators 4 and 5 causes a reversal of current derived from the exciters 18 and 19, since the exciter field-windings 22 and 23 are in series relation with generator armatures 8 and 9.

During retardation of the motor, the field windings 6 and 7, which have series characteristics, oppose the magnetization of the separately excited windings 10 and 11 and thereby assist in demagnetizing the generators rapidly, prior to a voltage reversal thereof. During the period of regeneration and dynamic braking of the motor 1 through the generator armatures 8 and 9 and the field windings 22 and 23, a proper load balance is maintained in the same manner that such balance is maintained during acceleration and normal operation of the machines.

In accordance with my invention, I am enabled to avoid the use of many complicated control devices otherwise employed for maintaining proper distributions and regulations in accordance with the varying load conditions. It is obvious that various modifications may be made in my invention without departing from the spirit thereof and I desire to be limited only in accordance with the scope of the appended claims.

I claim as my invention:

1. The combination with a motor having a separately-excited field-magnet winding and an extra field winding, of a pair of mechanically-connected generators, an exciter for each generator, a field winding for each exciter being connected oppositely in circuit with said generators for rendering the excitation of one generator dependent upon the current traversing the other generator, means for reversing the polarity of said generators and of said exciters, and means for energizing said extra field winding from said exciters and for maintaining the proper relative excitation of said motor field windings.

2. The combination with a direct-current motor having a separately-excited field winding and an auxiliary field winding, of a pair of mechanically-connected direct-current generators for supplying variable-voltage power to the motor, a series exciter for each generator, the series field windings of the exciters being connected in series-circuit relation with the armatures of their respective generators, the armature of each series exciter being cross connected to the auxiliary field winding of the opposite generator to control the excitation of one generator in accordance with the load on the other generator, said auxiliary field winding of the motor being connected in series-circuit relation with the exciters, a direct-current source of excitation for the main field windings of the motor and generators, and means for reversing the excitation of the main field windings of the generators and the auxiliary field winding of the motor to control the direction of operation of the motor.

3. The combination with a motor having main and auxiliary field windings, of a plurality of generators for supplying power to the motor, said generators being provided with main and auxiliary field windings, a series exciter connected to each generator having their field windings connected in series-circuit relation to the armatures of their respective generators, means including a reversing switch for connecting the armatures of the exciters to the auxiliary field winding of the motor, means for connecting the exciter of each generator to the auxiliary field winding of the other generator, a substantially constant-voltage source of direct current, means for connecting the main field winding of the motor to the direct-current source, and means including a reversing switch and a rheostat for connecting the main field windings of the generators to the direct-current source, thereby to control the voltage of the generators.

4. In a power-transmission system, in combination, a motor provided with an auxiliary-field winding, a plurality of mechanically-connected generators provided with separately-excited field windings and auxiliary field windings disposed to function as series-field windings, said generators being connected to the motor in parallel-circuit relation, an exciter for each generator having a series-field winding connected in the generator circuit, said exciters being connected in series-circuit relation to the auxiliary-field winding of the motor to provide excitation proportional to the motor load, the auxiliary-field winding of each generator being connected to the exciter associated with the other generator thereby to render the series excitation of one machine proportional to the load on the other machine to effect a predetermined load division between the generators.

5. In an electric drive, in combination, a motor provided with a series-field winding, two mechanically-connected generators for supplying power to the motor, each generator being provided with compounding and separately-excited field windings, an exciter for each generator, each exciter being provided with a field winding, the field windings of the exciters being connected in series with the generators, respectively, the compounding-field winding of each generator being connected across the exciter associated with the other generator to cause a variation in the excitation of either generator with a change in load on the other generator, the series-field winding of the motor being connected across the exciters in series to vary the excitation of the motor in response to the total current delivered by the generators.

In testimony whereof, I have hereunto subscribed my name this seventh day of July, 1924.

WILFRED SYKES.